Figure 1:
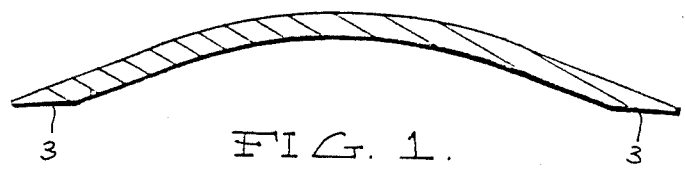

United States Patent [19]
Johnson

[11] Patent Number: 4,580,639
[45] Date of Patent: Apr. 8, 1986

[54] AGRICULTURAL SWEEP WITH PLANAR INTERMEDIATE SECTION

[75] Inventor: William M. Johnson, Winchlesea, Australia

[73] Assignee: Ralph McKay Limited, Maidstone, Australia

[21] Appl. No.: 571,815

[22] Filed: Jan. 18, 1984

[30] Foreign Application Priority Data

Jan. 20, 1983 [AU] Australia .................. PF7693

[51] Int. Cl.⁴ ............................................. A01B 39/20
[52] U.S. Cl. ...................................................... 172/730
[58] Field of Search ................ 172/720, 724, 730, 771

[56] References Cited

U.S. PATENT DOCUMENTS

| | | | |
|---|---|---|---|
| Re. 6,887 | 2/1876 | Haiman | 172/730 |
| 2,351,388 | 6/1944 | Baxter | 172/720 |
| 2,503,884 | 4/1950 | Noble et al. | 172/720 |
| 2,595,353 | 5/1952 | Graham | 172/730 |
| 2,882,983 | 4/1959 | Hill | 172/730 |
| 3,007,533 | 11/1961 | Hill | 172/730 |
| 3,156,307 | 11/1964 | Bledsoe | 172/744 |
| 3,923,104 | 12/1975 | Tibbs | 172/720 X |

FOREIGN PATENT DOCUMENTS 1499968 2/1978 United Kingdom ............... 172/724

Primary Examiner—Richard T. Stouffer
Attorney, Agent, or Firm—Christel, Bean & Linihan

[57] ABSTRACT

An implement for agricultural machines which is attachable to a tine of such a machine. The earth engaging portion includes steeply inclined side faces 11 and an inclined point 10 with a protrusion 14 which assists in directing work flow. The relatively flat portion 12 lies above the side faces 11 between them and the shaft portion 8 which is attachable to the tine. These implements are formed from conventional implement blanks and the height of the side faces is the same as that of conventional implements but the angle of inclination is greater.

6 Claims, 19 Drawing Figures

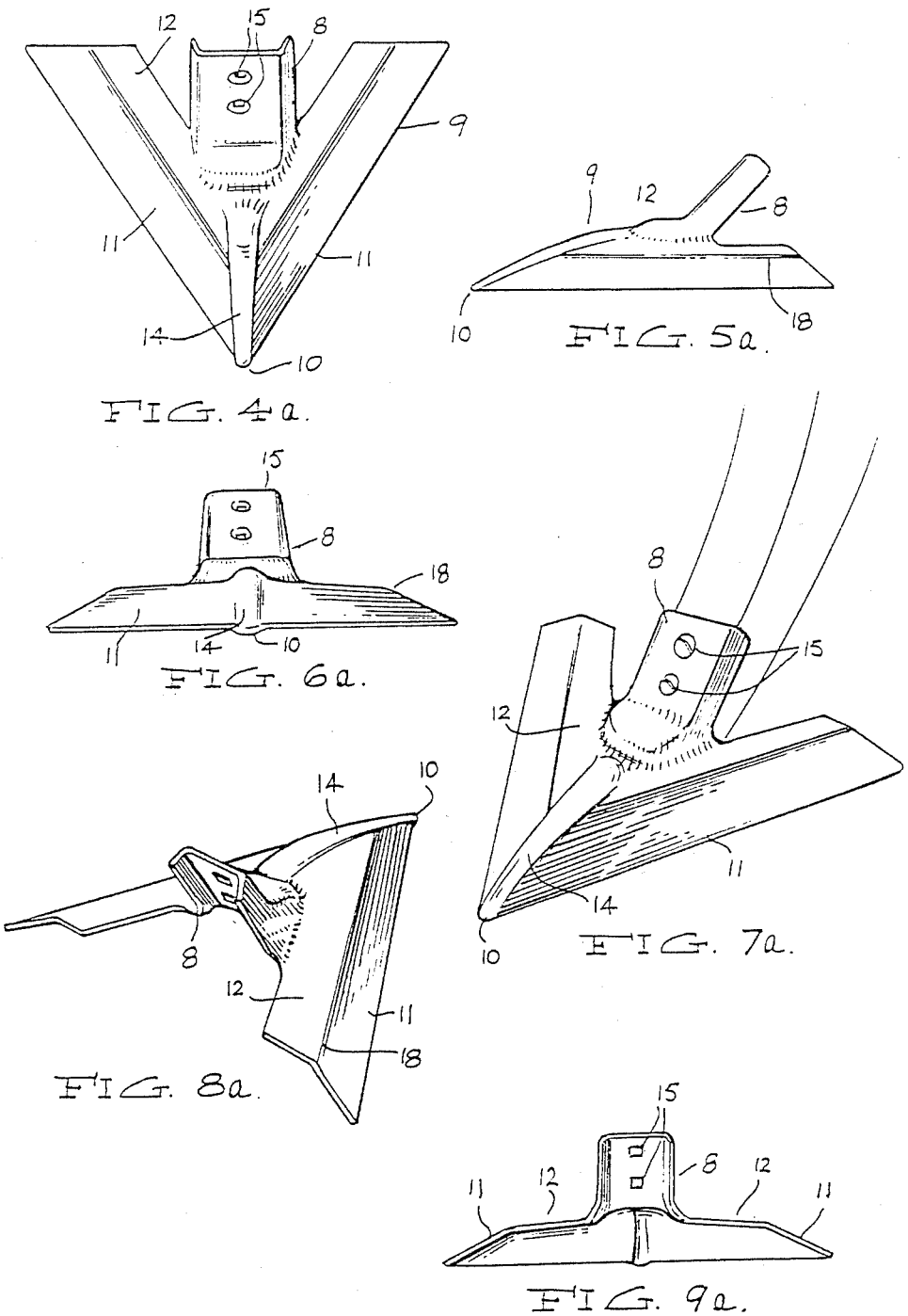

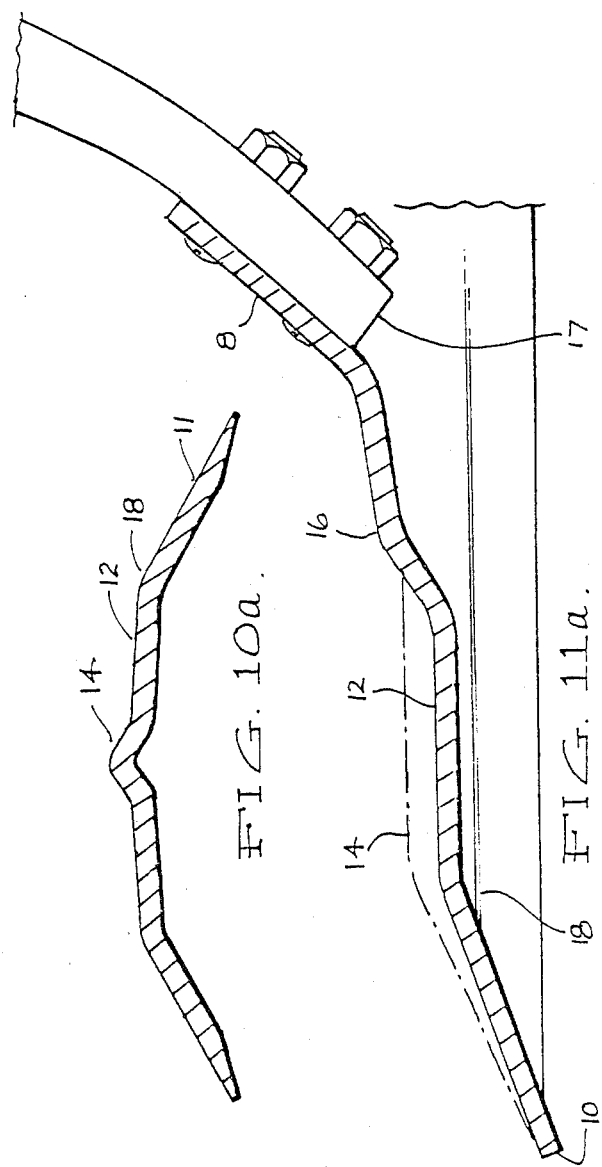

AGRICULTURAL SWEEP WITH PLANAR INTERMEDIATE SECTION

This invention relates to an improved agricultural sweep.

Conventional sweeps comprise a triangular earth engaging portion exhibiting swept back wings, which extend behind the line of the shaft which is positioned centrally behind the leading point. The angle of inclination to the horizontal of the upper surface of the earth engaging portion is pressed from plate metal blanks. The wear pattern of these sweeps is usually to round off the point and to wear the wing sections of the earth engaging portions down to a narrow width. The strength of the wings limits the extent to which the implements can be worn down because the likelihood of fractures increases.

Sweeps of this kind which are in general use in agriculture are described in U.S. Pat. Nos. 2,595,353 (Graham), 2,882,983 (Hill), 3,007,533 (Hill) and 3,156,307 (Bledsoe).

As agricultural machines to which these sweeps are fitted are increased in size the draft required to pull a plurality of sweeps through the soil increases.

The resistance against movement of the implement through the soil is due to a number of factors. Resistance is usually caused by soil flow over the metal and particularly the area of contact between the under surface of the implement and the soil.

Most implement wear occurs on the underneath or bottom surface portions. Also soil flowing over the upper surface of the implement accummulates in front of the stem or shaft and can extend up the tine. This naturally increases the load of the machine because more soil is being pushed. Also as this accumulated soil falls intermittently away the furrow formed is consequently uneven.

One attempt to overcome some of the problems of conventional sweeps was proposed by U.S. Pat. No. 2,351,388 (Baxter). However, the sweeps disclosed in this patent apparently have not been used. Baxter discloses a sweep having a higher approach angle for the near working surfaces and does suggest the provision of a horizontal flange for the rearwardly projecting wing sections of the sweep. However, the major soil flow is over the frontal portion of the sweep and there is no effective proposal for reducing draft caused by this portion of sweeps.

It is an object of this invention to reduce draft required for sweeps and to alter the wear life of sweeps.

To this end the present invention provides an agricultural earth engaging implement adapted to be secured to a shaft having an earth engaging portion which comprises a point with two swept back leading edges extending from said point, an inclined face extending from said point and leading edges to an intermediate section and an elongated protrusion extending from said point toward the base of said shaft when assembled therewith and terminating on said intermediate section, said earth engaging portion being formed from conventional blanks and the vertical height from said leading edges to said intermediate section being the same as the vertical height of a conventional earth engaging portion of a sweep.

The result of this invention is a more steeply inclined face on the earth engaging portion than is present in conventional sweeps. Generally the angle of inclination is from 25° to 45° to the horizontal preferably 30°. This inclination has two effects. Firstly, the area of metal on the under surface of the sweep which is in soil contact is reduced with a consequential reduction in wear rate and soil penetration resistance. Secondly, the pattern of soil disturbance by the sweep is radically altered because of the increase inclination.

In conventional sweeps the soil flows over the earth engaging portion in a continuous peeling pattern in contrast to the sweep of this invention which produces a chipping action that continually breaks the soil surface as the sweep passes beneath it. These two effects provide a further benefit namely a reduction in the draft required to pull a sweep through the soil. The increased approach angle of the working faces of the sweep results in reduced downward pressure on the improvement thus reducing draft and soil compaction. The movement of the sweep through the soil creates a shockwave in the soil ahead of the sweep and the sweep of this invention provides a shock pattern different to that of conventional sweeps. The reduction in metal-soil contact also reduces frictional drag and lessens draft requirements.

The provision of an elongated protrusion by indentation of the under surface, improves soil flow over the sweep and deflects the soil around the shaft. In conventional sweeps soil builds up in front of the shaft and increases the draft requirements. However, in the invention by providing an elongated protrusion up the inclined face behind the point and onto the horizontal section, the soil flow is diverted to each side of the shaft. Another advantage of the elongate protrusion is that it maintains a point on the implement and prevents wear of the point into a smooth curve as in conventional sweeps.

The provision of the horizontal section in the earth engaging portion provides strength for the extended wing sections of the sweeps as well as a surface that assists in soil flow over the sweep.

Figure 2:
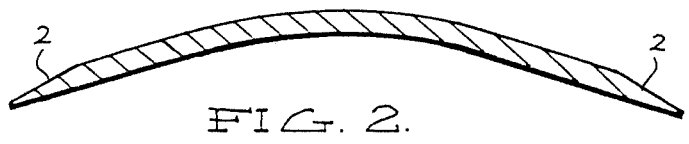
Figure 3:
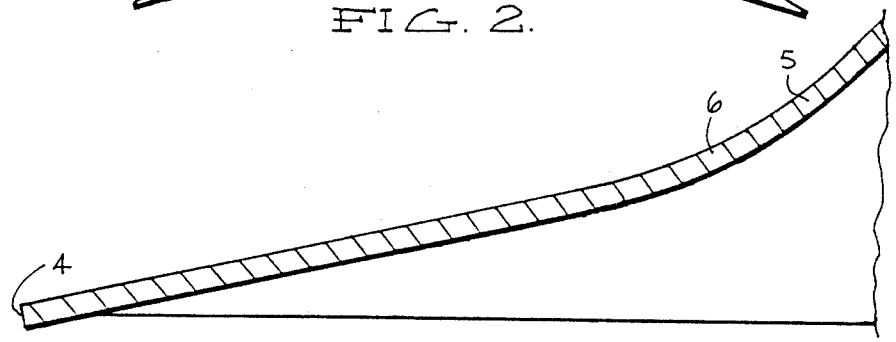

In order to better describe the preferred aspects of this invention it is necessary to appreciate some of the constructional features of the conventional prior art sweeps. FIGS. 1 and 2 illustrate typical end section views of two prior art sweeps while FIG. 3 shows a typical side section view of a conventional sweep.

In the prior art the sweep 1 was symmetrical in cross section as shown in FIGS. 1 and 2 and exhibited a shallow domed contour. To assist in soil penetration the leading edges are formed to provide a chamfered cutting edge which is either on the upper surface as at 2 in FIG. 2 or on the lower surface as at 3 in FIG. 1. Similarly the side profile of the sweep exhibits a continuous progress toward the shaft portion 5 from the point 4. The working face of the sweep is generally that portion extending from the point 4 and the edges 2 and 2 to the base 6 of the shafts.

Figure 10:
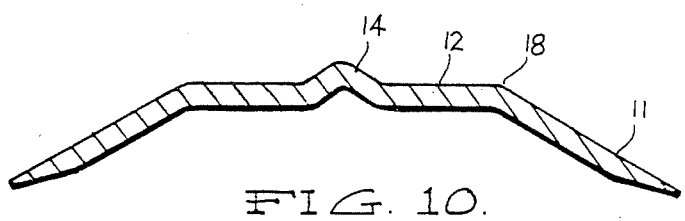
Figure 11:
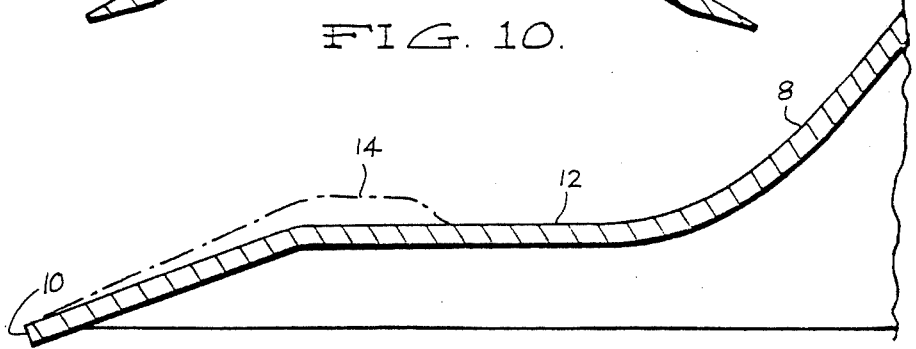
Figure 4:
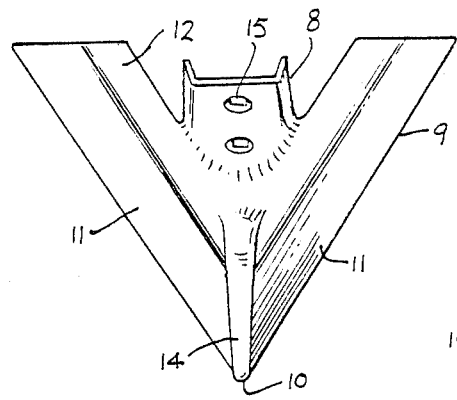
Figure 5:
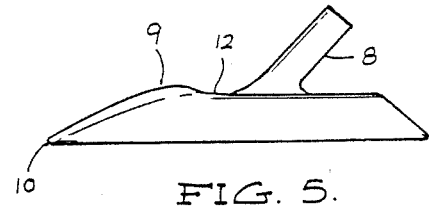
Figure 6:
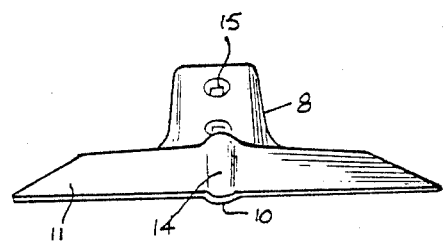
Figure 7:
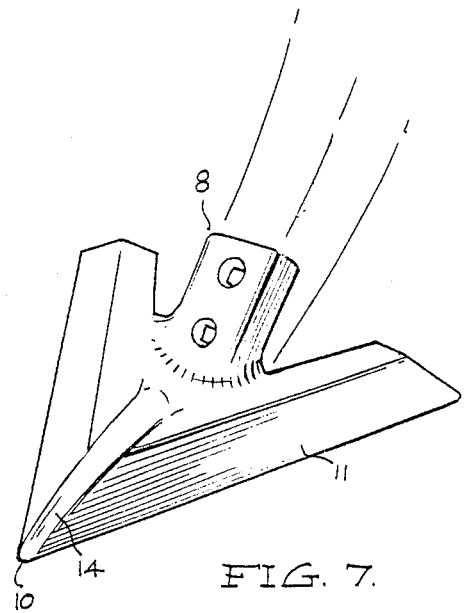
Figure 8:
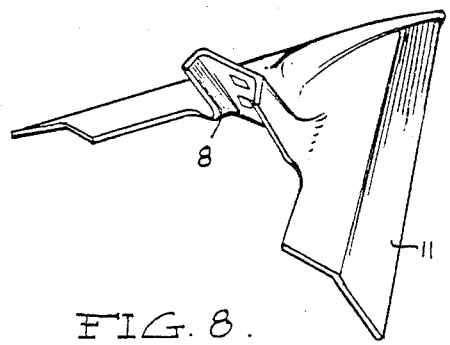
Figure 9:
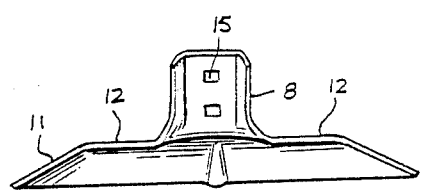

A preferred embodiment of this invention is illustrated in the accompanying drawings in which FIG. 4 is a plan view, FIG. 5 is a side view, FIG. 6 is a front view, FIG. 7 is a front perspective view, FIG. 8 is a front view, FIG. 7 is a front perspective view, FIG. 8 is a rear perspective view and FIG. 9 is a rear view. FIG. 10 is an end sectional view and FIG. 11 is a side sectional view. A second preferred embodiment of the present invention is shown in FIGS. 4a to 11a which are essentially similar views to FIGS. 4 to 11.

Referring first to FIGS. 4 to 11, the sweep comprises a shaft portion 8 and an earth engaging portion 9. The earth engaging portion includes a leading point 10 and two working faces 11 which extend back at an angle behind the shaft 8. As seen in FIGS. 2, 3, 4 and 5 the working faces 11 are angled approximately 30° to the horizontal which is greater than conventional sweeps. At the top of the working faces 11 a horizontal landing 12 extends between the working faces 11 and the shaft 8 and functions as a flange on the extended portions of the working faces 11 which is behind the shaft 8.

The height of the working faces 11 is approximately the same as that of conventional sweeps as shown in FIGS. 1, 2 and 3, the difference being that less metal is used in forming the working faces because of the landing 12. This means that the soil is lifted in a different mode than in conventional sweeps.

The same blanks as are conventionally used are used in forming the implement of this invention.

An elongated protrusion 14 is pressed into the earth engaging portion 9 at the junction of the two working faces 11 and extends from the point 10 onto the landing 12. The protrusion 14 is tapered in width and widens from the point 10 toward landing 12. This protrusion provides for a flow of soil over the sweep without any build up in front of the shaft 8.

The shaft 8 as shown is arranged for securing to a tine by means of bolts through the holes 15. However, other forms of securing can be used such as conventional wedge-on shafts on which the shaft is formed into a tapered socket adapted to receive a complementary tapered tine foot.

It can be seen that becuase of the steep angle of the working faces less metal is exposed to frictional contact with the soil so that the rate of wear is reduced. Because the landing 12 reinforces the earth engaging portion the sweep is still usable even when the working faces are reduced to a fraction of their original height.

Referring now to FIGS. 4a to 11a, it will be appreciated that the just described sweep has been modified in the following respects. Like features have been given the same identifying reference numerals. In this embodiment the elongaed protrusion 14 has been extended has been longitudinally extended to a position adjacent the shaft 8 enabling a tine to be secured thereto. Additionally, a small area 16 around the base of the stem or shaft 8 has been raised to allow the tine end 17 to be above the transition region 18 between the working faces 11 and the landing 12. This arrangement avoids the end of the tine 17 being damaged upon wear of the ground engaging implement. A preferred additional feature is the provision of a small camber or angle of inclination to the landing 12. This may be curved or flat but preferably should have an angle of inclination of no more than 10° and preferably in the range of 5° to 7°. This configuration allows the sweep to still be useful even when it is worn down to the transition region 18.

From the foregoing description it can be seen that the sweeps described achieve the objects of this invention.

I claim:

1. An agricultural earth engaging implement including a shaft and an earth engaging portion which comprises a point with two swept back leading edges extending from said point, an inclined face extending from said point and leading edges inclined at an angle of from about 25° to 45° to the horizontal, said inclined face extending to an intermediate section and an elongated protrusion extending from said point toward the base of said shaft when assembled therewith and terminating on said intermediate section, said protrusion formed by indentation of the undersurface of said earth engaging portion, said intermediate section being planar, parallel to said leading edges, and defining an acute angle no more than 10 degrees relative to the plane containing said leading edges, said intermediate section being located forwardly of said shaft and extending along parallel to said swept back leading edges between said shaft and said inclined face.

2. An agricultural implement according to claim 1 wherein said acute angle is in the range of five to seven degrees.

3. An agricultural implement according to claim 1 wherein said elongated protrusion is of tapering cross section and increases in height and width toward said shaft.

4. An agricultural implement according to claim 1 wherein said elongated protrusion extends to a position adjacent said shaft on the intermediate section.

5. An agricultural implement according to claim 1 wherein said shaft is formed to enable the implement to be secured to a tine such that an end region of said tine is located above a transition region between the inclined faces and said intermediate section.

6. An agricultural implement according to claim 1, wherein said earth engaging portion is formed from blanks.

* * * * *